Dec. 6, 1966 R. L. LA BARGE 3,290,077
JOINING AND JOINTED STRUCTURES
Filed July 15, 1964 2 Sheets-Sheet 2
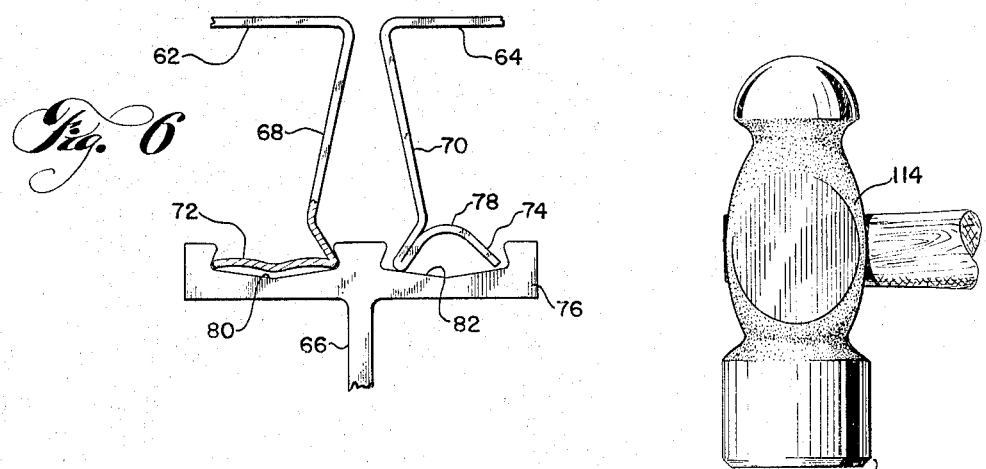
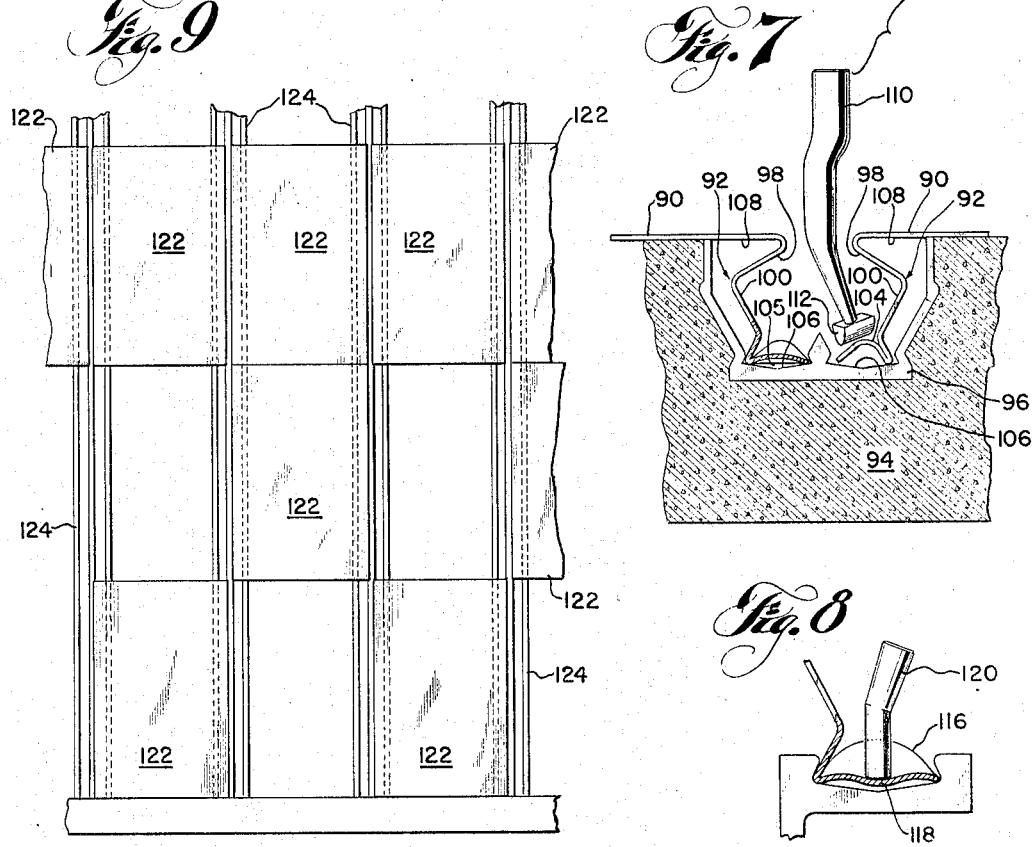
INVENTOR.
Robert L. La Barge
BY
S. Ernest Low.
ATTORNEY United States Patent Office 3,290,077
Patented Dec. 6, 1966

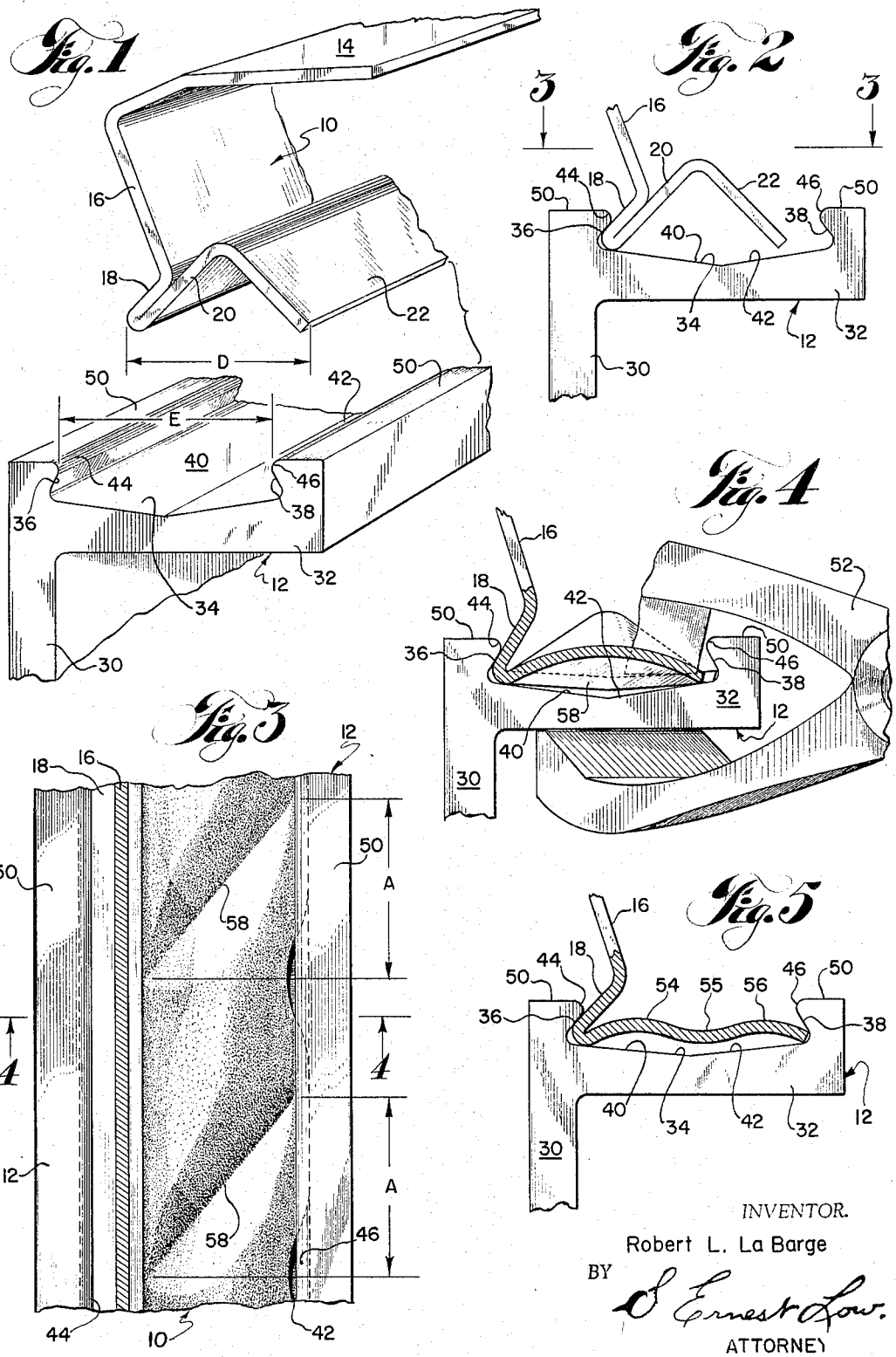

3,290,077
JOINING AND JOINTED STRUCTURES
Robert L. La Barge, Murrysville, Pa., assignor to Aluminum Company of America, Pittsburgh, Pa., a corporation of Pennsylvania
Filed July 15, 1964, Ser. No. 382,698
9 Claims. (Cl. 287—189.36)

This invention relates in general to joining practices and mechanically jointed structures. It is more particularly concerned with providing high strength joints between members, and structures incorporating the same, one of which members is provided with an initially predeterminately configurated relatively plastically defromable marginal edge portion responding to subsequent permanent deformation and transformation or transconfiguration within an undercut recess in a second substantially less-deformable member to provide a mechanical joint or connection therewithin characterized by relatively high residual joint-restraining forces generated within, and as a result of, and so confined resilient and subsequently permanently transformed and deformed marginal edge portion of the first-mentioned member.

Conventional mechanical fastening devices, such as rivets, bolts, and the ever-increasing wide variety of commercially available screw type fasteners, and joints relying thereon, all involve some form of initial preparation of the elements to be joined, such as lancing, punching, drilling, with or without reaming and/or tapping, or some other preparatory treatment of the members to be joined, and joints so conventionally produced, because of the aforesaid separate fasteners and time-consuming operations attendant their use, often spell the economical difference between competitive profit and loss in the fabrication of structures employing available conventional joining practices.

It has also been conventional to employ resilient snap-joining practices, wherein jointure is obtained by resilient snap-engagement, sans permanent deformation, between adjacent members, and/or a third member, and reliance placed on resiliency alone, of one or more of the members so assembled, to maintain the joint therebetween. Snap-joining practices of this general and conventional type, although perfectly acceptable in many situations and structures, are inherently known to develop little if any shear load capacity, and are therefore never recommended or sutiable in joining practices where structural and mechanical strengths have been specified.

The present invention is distinguished from the above-acknowledged practices in the art in that the inherent plastic resiliency and permanently deformable and swedgeable properties of at least the marginal edge portion or portions of one member to be joined, in accordance with the invention, is combined with the relatively substantially less or non-deformable and substantially non-resilient properties of a second member comprsing a joint therebetween, with minimum time consuming preparatory treatment of the members constituting the joint structure and in the absence of conventional expensive separate penetrating, fastening and/or clamping devices, or the requirement of a third or additional members over and above the two major members to be unitarily joined.

It is therefore a primary object of the present invention to provide a structurally and mechanically sound and rigid load-carrying joint between two members entailing simplified and economical treatment and assembly thereof, while exhibiting substantialy rattle-free relatively stable or immobile characteristics under atmospheric and other intermittent loading conditions to which a structure incorporating the joint or joints of the invention would be normally exposed.

Another object of the invention is to provide a relatively inexpensive strength-carrying joint structure between a unitary marginal resilient predeterminately configurated edge area of a panel, or similar plastically and permanently deformable member, and a second relatively less-deformable supporting member therefor.

An additional object of the invention is to provide a structural one-piece panel, preferably of uniform gauge plastically resilient material, having an integral depending flange and contiguous angularly offset terminal marginal connecting edge area, the latter marginal edge area being predeterminately configurated for ready entry and disposition within an open channel in a second member of substantially non-deformable material having undercut oppositely disposed side walls, and which configurated marginal connecting edge area, on subsequent permanent deformation, develops internally stressed and loaded transverse columnar frictional engagement between the opposite marginal edges of the panel and undercut side walls of the channel receiving the same.

A further object of the invention is the provision of a joint structure between two structural members capable of being obtained as an in plant or in field erection, without the necessity of special tools, preparatory labor-involving operations, or ancillary joint securing members, and which can be practiced and performed by relatively unskilled labor.

Other and additional objects of the invention will become apparent to those skilled in the art on consideration of the following description and appended illustrations, in which:

FIG. 1 represents a perspective view of a fragmentary portion of a sheathing or similar panel, provided with a configurated marginal edge, in exploded or separated association in respect to a support therefor, in accordance with one embodiment within the teaching and scope of the invention;

FIG. 2 represents a fragmentary and elevational view of the elements of FIG. 1 in initial disposition thereof immediately prior to permanent joining of the same;

FIG. 3 represents a fragmentary sectional top plan view, taken on the plane 3—3 of FIG. 2, following a preferred method of producing mechanical swedged jointure between the elements thereof;

FIG. 4 represents an end elevational view, in partial section, taken on the plane 4—4 of FIG. 3;

FIG. 5 represents an end elevational view substantially similar to FIG. 4, and in partial section, illustrating a modified concept of the invention;

FIG. 6 represents an end elevational view, in partial section, of a further embodiment or adaptation of the swedged joint of FIG. 5;

FIG. 7 represents an end elevational view, in partial section, of a still further joint construction falling within the scope of the invention in its application to overlying sheathing;

FIG. 8 represents a fragmentary partial sectional view of joint structure which may be substituted for any one of the previous joints; and FIG. 9 represents a fragmentary front elevational view of a partially installed wall, screen, or similar area, employing joining practices of the invention.

Common and preferable to all embodiments and uses of the invention, hereinafter described in detail, is the provision of a panel, or similar facing or sheathing element, having at least one, and preferably both oppositely disposed depending parallel marginal edges, whether integral or of unitary construction, initially permanently and predeterminately configurated or transversely profiled to permit unrestricted initial assembly via facile entrance thereof into a laterally undercut recess in a supporting member in registry therewith. In addition, at least the configurated marginal edge portion of the panel or sheathing member is characterized by exhibiting inherent resiliency capable of the aforesaid permanent plastic deformation, whereas the recessed supporting member is of a design and is constructed from materials which exhibit relatively substantially less or non-deformable properties, under the forces essential to subsequently further plastically and permanently deform and transform the configurated marginal edge portion of the panel into swedged interlocking lateral contacting disposition within the undercut recess in the supporting member to thereby provide mechanically firm and structurally sound strength-carrying jointure therebetween. In this regard, an otherwise substantially rigid or non-plastically deformable panel may require localized or selected marginal edge treatment, such as annealing in the case of integral metallic panels, to permit more readily deformable and permanent transformation thereof in practicing the invention.

In more detail, and referring to the appended illustrations, FIG. 1 is illustrative of a panel or similar sheathing member 10 in separated or exploded arrangement and association in respect to a supporting member 12 therefor. In this connection, the panel 10 is preferably fabricated from uniform gauge sheet metal, aluminum and its alloys being a conventional but not a limiting material for this purpose, to provide an outwardly exposed frontal area 14 having a rearwardly depending or extending flange 16 along at least one marginal edge thereof.

The depending flange 16 may be, and preferably is, inwardly and rearwardly inclined in respect to its unitary or integral connection with the exposed frontal area 14, and is also angularly outwardly and downwardly struck over a profiled length 18, preferably less than the length or depth of the flange 16, which shorter length 18 is reversely bent flat on itself to provide an inwardly and upwardly inclined extending leg portion 20 contiguous with a downwardly and further inwardly extending leg portion 22, whereby the contiguous portions or legs 20 and 22 of the lower terminal marginal area of the panel 10 provide an inverted upstanding substantially transverse axially contiguous V-shaped marginally extending profile or configuration over substantially the axial length dimension of the panel. The aforesaid upstanding profile is manifestly not structurally limited to the precise angle illustrated at the juncture of legs 20 and 22, the chief desideratum being that initial free entry and subsequent permanent deformation thereof will perform in accordance with the practices of the invention, as hereinafter described in more detail.

The supporting member 12 may be selected in the form of a more or less conventional structural shape having a web 30, for ease of attachment and/or erection, and a laterally extending flange 32, the latter being provided with an outwardly facing, longitudinally uniform axially extending undercut recess 34. The recess 34 is preferably defined by oppositely disposed downwardly and outwardly inclined or diverging side walls 36 and 38, in respect to an otherwise open unrestricted entrance thereto, and is also preferably centrally depressed or recessed as by the provision of oppositely inwardly and downwardly inclined substantially centrally intersecting bottom planar wall areas or web surfaces 40 and 42 in preferably relatively sharp angular opposite outer edge contiguous connection with the aforesaid inclined side walls 36 and 38, respectively. Relatively small radii at the aforesaid lines of outer edge contiguous connection with the depressed bottom web surface of the recess 34 can be tolerated so long as the diverging side walls 36 and 38 provide the outwardly and downwardly directed angular undercut grooves in their contiguous connection with the bottom wall areas 40 and 42, respectively. The inclined side walls 36 and 38 are also preferably, but not necessarily, convexly curved at 44 and 46 in contiguous smooth blended connection with outwardly facing coplanar surfaces 50 preferably parallel to the under surface of the flange 32 of the supporting member 12. Aluminum alloy extrusions have served quite satisfactorily for the supporting member 12 of the invention.

FIG. 2 is illustrative of initial disposal of the offset rearwardly located aforedescribed configurated lower marginal edge area of flange 16 of a so provided panel 10 within the aforedescribed undercut recess 34 of the supporting member 12. Therein it will be observed that the outwardly and downwardly angularly inclined marginal surface extension 18 of the depending flange 16 of the panel 10 is preferably of somewhat longer length than the depth of the recess 34 and is also preferably substantially complementary in its angularity to the side wall 36 thereof. However, the inclination of extension 18 may be inclined to a greater degree towards the horizontal so long at the over-all maximum transverse chord width D (FIG. 1) of the upstanding inverted V-shaped terminal configuration of the panel 10 is less than the maximum transverse width E (FIG. 1) of the unrestricted entrance to the recess 34 by an amount of clearance sufficient to provide facile or ready entrance of the initially configurated panel connecting flange within its recess 34.

FIGS. 3 and 4 serve to illustrate one practice of the invention for obtaining mechanical jointure between the panel 10 and supporting member 12. Therein it will be observed that the fragmentary plier or hinged tongs type crimping tool 52, conventional inexpensive tile-cutting pliers having been sucessfully employed, has permanently deformed and transformed the upstanding inverted V-shaped lower marginal edge portion or connecting flange of the panel 10 at axially spaced locations 58 preferably, but not necessarily, angularly disposed along the axial marginal length thereof into interlocking opposite edge swedged engagement within the undercut laterally opposite grooves formed by the downwardly diverging side walls 36 and 38 and respective immediately adjacent contiguous portions of the depressed bottom wall surfaces 40 and 42 defining the undercut recess 34.

Mechanical testing and outdoor wind exposure has established that the structural strength, stability, and rattle-free characteristics of joints falling within the scope of the instant invention, and typified by the joint of FIGS. 1 through 4, have been greatly enhanced by providing and generating angularly disposed internally stressed and loaded columnar wedging action between the opposite subtending lateral edges of the permanently deformed and transformed initially upstanding configurated or profiled contiguous legs 20 and 22 of the angularly offset terminal or marginal connecting flange of the panel 10 and the surfaces forming the laterally opposite undercut grooves of the recess 34 in the supporting member 12. This is best illustrated in FIGS. 3 and 4 where the relatively sharp blade or wedge-shaped working face of the crimping tool 52 has provduced oppositely directed edge-engaging transversely loaded column sections or areas in the form of the substantially horizontal, straight, or flat-bottomed valleys 58 at axially spaced angularly disposed intervals along the length of the offset marginal connecting flange formed by the so permanently deformed contiguous legs 20 and 22.

It will be appreciated that the aforesaid transconfigurated marginal connecting flange, axially on either side of each of the valleys 58, and particularly in the plane substantially bisecting each of the valleys 58 in normal disposition in respect to the opposite undercut side walls of the recess 34, will also be permanently deformed by the swedging operation performed by the tool 52 to produce transversely undulating internally stressed and loaded laterally wedging columnar sections or areas blending into the depressed valleys 58 and extending axially therefrom to varying degree over a distance A (FIG. 3) to thereby define substantially rectangular internally stressed and loaded columnar joint areas or sections of which the depressed diagonally disposed valleys 58 serve to stabilize the immediate undulating areas in substantially transverse disposition on either side thereof.

It was discovered in the development of the invention that it was impossible, under prevailing conventional fabricating practices and schedules, to always insure a precise and accurate over-all transverse contiguous length for the profiled legs 20 and 22 which, on subsequent permanent deformation thereof, would insure internally stressed substantially straight, horizontal, or flat-bottomed columnar valleys 58 in angular or normal transverse disposition to the opposite lateral undercut or grooved side wall surfaces of the recess 34 because of prevailing and necessary manufacturing tolerances. This will be manifest when it is considered that undersize miscalculation of the over-all transverse contiguous length or width of the profiled legs 20 and 22 of the marginal connecting flange would result in failure to produce the relatively high residual joint-restraining forces necessary to accomplish substantially static swedged jointure on subsequent deformation thereof.

It is for the aforesaid seasons, and under the practice of the invention, that the contiguous transverse over-all length or width of the initially profiled legs 20 and 22 has been purposely predetermined to fall within 3 to 10 percent in excess to the maximum normal transverse width of the recess 34 to insure dependable and repeated commercial success of the joining practices and joints of the invention. In addition, angular disposition of the permanently depressed and deformed valleys 58 (FIGS. 3 and 4) between 40° to 50°, and preferably 45°, to the longitudinal axis of the recess 34, has been found on test to develop maximum structural strength, rigidity and stability of joints produced in accordance with the invention.

Alternative swedged jointure of the lateral offset connecting flange formed by the contiguous upstanding legs 20 and 22 (FIGS. 1 and 2) has also been obtained by substantially central permanent deformation of the initial configured offset flange over its entire axial length into the transverse axially extending undulating configuration illustrated in FIG. 5. Therein, it will be observed, that the apex of the contiguous legs 20 and 22 has been downwardly and permanently depressed to produce an axially extending valley 55 in contiguous integral connection with the upwardly projecting lateral crests 54 and 56 to thereby wedge opposite subtending longitudinal edges of the offset connecting flange of a panel, or the like, within the laterally opposite grooves formed by the downwardly diverging side walls 36 and 38 and respective immediately adjacent bottom web surfaces 40 and 42 of the recess 34. Manifestly the single axial deformation productive of the valley 55 and lateral crests 54 and 56 could be replaced by two or more axially deformed transversely separated valleys and connecting lateral crests, if desired. In fact, such alternative joint construction and structure (FIG. 5) of the initially dimensionally same profiled contiguous legs 20 and 22 over the entire axial marginal length thereof has, as distinguished from the axially spaced or localized internally stressed column sections of axial length A (FIGS. 3 and 4), resulted in producing a uniform undulating internally stressed and loaded column reaction transversely and laterally normal over the entire axial length of the joint so produced quite comparable in holding power and strength to the preferred axially spaced internally stressed column sections incorporating the substantially straight or horizontal stabilizing angularly disposed valleys 58.

FIG. 6 is also illustrative of a joining practice and installation falling within and exhibiting all of the required characteristics of the invention. Therein two panels 62 and 64 are adjacently assembled and mechanically joined or secured to a double recessed supporting member 66.

The adjacent panels 62 and 64 are each preferably similar in respect to their rearwardly and inwardly depending adjacent marginal edge flanges 68 and 70 and terminal or marginal angularly offset connecting flanges or areas 72 and 74 in adjacent marginal disposition of two such panels. Otherwise the offset configurated lower terminal connecting flanges 72 and 74 may be similar in preformed initial profile to the inverted substantially V-shaped configuration of the panel of FIGS. 1 through 5, or they may be configurated upwardly and outwardly in substantially semi-circular initial preformed profile, as shown at 78 in the right-hand panel 64 of FIG. 6.

The supporting member 66 in this embodiment of the invention is provided with a pair of adjacent similar laterally undercut recesses 80 and 82 outwardly facing in the flange 76 thereof, the recesses being otherwise configurated to provide a depressed central area as in the case of the previously described recess 34.

The right-hand panel 64 (FIG. 6) has been illustrated in the initial profile and loose entry of its securing or connecting flange 74 within its underlying undercut recess 82, whereas the adjacent or left-hand panel 62 is in final permanently deformed securement of its flange 72 within its underlying undercut recess 80 over the entire axial length thereof similar to the internally stressed transverse undulating column connection of FIG. 5.

It will also be observed that the oppositely inwardly inclined disposition of the depending flanges 68 and 70 permits selection in their angularity and projecting length to provide exposed outer edge abutment of adjacent panels 62 and 64, if desired, or a definite separation therebetween to provide emphasized shadow line treatment between outwardly facing surfaces of the adjacent secured panels in FIG. 6.

A further embodiment of panel and joining practice falling within the scope of the invention is illustrated in FIG. 7. Therein adjacent substantially similar panels or sheathing elements 90 have been preferably fabricated from uniform gauge sheet metal, such as conventional aluminum rolled stock, roll or otherwise edge configurated to provide a similar marginal edge rearwardly and outwardly depending flange axially along at least the opposite adjacently disposed edges thereof and identified in entirety by the reference numeral 92.

Each of the panels 90 is intentionally selected to preferably contactingly overlie a concrete or similar permanent body 94, such as a wall, partition or ceiling, with the rearwardly depending flanges 92 extending into a generally substantially less or non-deformable channel-shaped anchor member 96 securely embedded within or securely attached to the body 94. The depending flanges 92 are each similarly and preferably angularly configurated and oppositely disposed to each provide inwardly directed angularly bent and disposed contiguous leg portions 98 and 100, the leg 100 of which terminates in an initially angularly offset outwardly and upwardly directed curvilinear cross-sectional configuration 104 similar to be identical configurated lower terminal connecting flange portion 78 previously illustrated and described in the embodiment of the invention of FIG. 6. In this connection, and as in the case of the initial curvilinear cross-sectional configuration 78, the substantially inverted V-shaped terminal panel connecting flange of the embodiment of FIGS. 1 through 4 may, if desired, be substituted for the initially curvilinear configuration or profile 104 in FIG. 7.

The securing channel member 96 is provided with laterally adjacent and separated similar laterally undercut bottom recesses 106 dimensionally designed and proportioned in respect to the lower terminal connecting flanges 104 in the same manner described for the substantially similar configurated flanges of the aforesaid panels 10, 62 and 64 and undercut centrally depressed recesses 34, 80 and 82, respectively, associated and illustrated therewith. In assembly, the panels 90 are preferably placed in substantial overlying rear face contact with a plane exposed surface of the masonary or similar rigid body 94 to be sheathed thereby, marginal facial edge portions 108 of each of the panels 90 extending over the open unrestricted entrance to the channel securing member 96 to present the rearwardly depending panel flanges 92 within the channel member and the lower terminal configurated offset edge portions 104 thereof in registry within one each of the adjacent bottom undercut recesses 106.

Whereas the right-hand panel 90 in FIG. 7 has been illustrated with its angularly disposed connecting flange initially loosely installed within its registered undercut recess 106, the adjacent similar left-hand panel 90 has been mechanically secured by axial marginal localized swedging deformation of the configurated lower terminal marginal flange 104 to locally and permanently deform and transform the same at 105 in the same internally stressed transverse columnar manner described above in regard to FIGS. 3 and 4 to thereby provide mechanically firm and sound interlocking jointure of the panels 90 within their securing and mounting channels 106.

The facial and overlying disposition and nature of the installation of FIG. 7, as distinguished from the rearwardly exposed and unrestricted nature of the assembled installations of FIGS. 1 through 6, requires employing a swedging tool that is operative from the face of the sheathed structure of FIG. 7. This has been readily accomplished by employing a punch or peening tool 110, preferably provided with a transversely disposed lower terminal crimping blade or end 112, and conventional hammer 114. Joints thus produced have been similar in structure and strength to those of FIGS. 3 and 4, obtained by employing the crimping tongs or tool 52. As will be understood, the upstanding arcuate connecting flanges 104 in FIG. 7 could, if desired, be depressed over their entire axial length to provide the transverse internally stressed undulating column section of FIG. 5.

FIG. 8 is illustrative of a substituted practice for any one of the previously described joining practices and joints and employs localized permanent depression of an initially upstanding configurated marginal connecting flange of a panel, or the like, at axially spaced locations along the axial length thereof to provide localized lateral swedged engagement of the marginal flange within a laterally undercut recessed groove in registry therewith. In this particular embodiment of the invention the initially configurated upstanding terminal flange 116 of the panel member has been locally depressed at 118 by means of a suitable punch type tool 120 to produce transverse localized undulating internally stressed transverse column sections or areas otherwise similar at localized axially spaced areas to the axially continuous undulating columnar joints of FIGS. 5 and 6.

FIG. 9 is a more or less fragmentary front elevational view of a typical solar, decorative, or similar screen installation employing panels and mounting principles falling within the scope of the invention, as above described. Herein individual panels 122, having rearwardly depending lower terminal configurated marginal securing or connecting flanges similar to any one of those previously described, are mounted and mechanically secured by permanent deformation of their aforesaid initially configurated terminal connecting flanges within laterally undercut recesses in adjacent flanges of upright parallel spaced supporting members 124. Ornamental architectural panels of the general type disclosed and claimed in pending United States design patent applications D. 77,088, D. 77,089, D. 77,090, D. 77,098, D. 77,099 and D. 77,100, filed in the name of Joseph M. Krippendorf, and provided with opposite parallel marginal terminating or connecting flanges in accordance with any of the configurations and mounting practices hereinabove described, are productive of solar screens and concealing overlays in substitution for the structures disclosed in United States Patent 3,063,520, granted November 13, 1962 in the name of Paul E. Freeman.

Regarding the initially configurated lower terminal connecting flange areas of the several panels described above, which areas are permanently deformed and transformed to provide internally stressed transverse columnar interlocking engagement within the laterally undercut recesses in their respective mounting and securing members, it is significant to the success and advantages of joining practices falling within the invention that at least the materials of the aforesaid configurated and subsequently deformed terminal connecting flange areas, or portions of the panels unitarily providing the same, exhibit inherent natural resiliency and respond to permanent plastic deformation beyond the elastic limit of such materials, in contrast to lesser or non-deformable properties exhibited by the supporting members providing the undercut recesses for receiving and securing the aforesaid configurated terminal flange areas of the panels. Conventional ferrous and non-ferrous metallic sheet materials have fully satisfied the resilient and permanently deformable characteristics and properties required for the lower configurated terminal marginal connecting flanges or areas of the panels to be subsequently permanently and deformably secured, whereas substantially heavier thickness metallic or similar members, such as structural shapes extruded from aluminum and its alloys, or the like, have proven successful in respect of the mounting members provided with the undercut attaching grooves or recesses.

It was discovered during the development of the invention that it was impossible, under prevailing conventional fabricating practices and tolerance schedules, to always insure a precise and accurate over-all transverse contiguous length, or offset width, of the initially profiled marginal connecting flanges of the panels, or similar structures, which, on subsequent permanent deformation, would insure and develop acceptable internally stressed columnar loaded transverse areas or sections of the deformed connecting flanges within the recessed members in jointure therewith. This will be manifest when it is considered that undersize miscalculation of the aforesaid over-all contiguous transverse length or offset width of an initially profiled or configurated marginal connecting flange would result in complete joint failure, on subsequent permanent deformation, to produce swedged jointure within the laterally undercut recess receiving and supporting such an undersize connecting flange. It is for this reason, and under the practices of the invention, that the contiguous over-all offset width or transverse length of an initially configurated connecting flange was predetermined and purposely selected to fall within 3 to 10 percent in excess of the maximum normal transverse width across the diverging or undercut side walls of the recess in the supporting member receiving the connecting flange in each instance.

In addition to the aforesaid excess initial profile width or contiguous transverse length of the offset marginal area of a connecting flange in accordance with the invention, success and commercial acceptability and duplication of joints satisfying the invention were found to be directly related to the extent of the depressed bottom surface or web area of the recess receiving and subsequently restraining a permanently deformed connecting flange therewithin. In this regard the depressed bottom surface area of the aforesaid recess, or recesses, permits overcrimping of the initially profiled connecting flange or flanges under permanent deformation therewithin to overcome the deleterious effects of springback inherent in the resilient characteristics of the connecting flanges. For example, if and where the over-all contiguous transverse length of an initially profiled connecting flange was such that it was only capable of permanent deformation under an applied force to flatten the same into contact transversely across a flat bottom surface of a recess receiving the same, springback on release of the applied force would react to decrease any residual transverse columnar stresses developed in a so deformed connecting flange in its restrained flattened condition and consequently reduce the ability of the same to carry or sustain columnar stresses essential to provide the new and improved joint structures of the invention. Overcrimping of the initial connecting flanges, on the other hand, towards the depressed bottom surface web or area of the recesses depicted and explained as essential and characteristic of the invention, permits and allows springback on release of the deforming force without appreciable loss in the internally stressed condition of the so permanently deformed connecting flanges essential to producing the transverse columnarly and internally stressed joint structures of the invention.

Ideal and optimum conditions would prevail were it possible to overcrimp each of the initially configured connecting flanges hereinabove described and illustrated, whether axially continuously or axially intermittently permanently deformed, a sufficient amount to insure return by springback of the permanently deformed connecting flanges to position the effective internally stressed transverse columnar axis of each so permanently deformed connecting flange in substantial coincidence with the transverse plane of the maximum transverse dimensional width between the diverging or undercut side walls of the recess of the joint structure in each instance. Such optimum conditions and results are reflectable and controllable by correct and accurate selection of the maximum depth of the depressed bottom wall surfaces of the undercut recesses receiving the connecting flanges. Practical experience under the invention, however, has revealed the existence of a rectangular band or area transversely located within the maximum depth of the laterally undercut recesses of the supporting members of the joints of the invention, which band or area is substantially equally disposed on either side of the plane of the maximum transverse width dimension between the opposite diverging side walls of the recesses, and within which band or area the effective columnar axes of the internally stressed and/or loaded columnarly characterized permanently deformed connecting figure column areas or sections assume static equilibrium following springback.

It is also within this horizontal rectangular band or area that the transverse transconfigurated permanently deformed columnar areas or sections of the connecting flanges are disposed, with some transversely disposed undersurface area or areas thereof, facing towards the depressed bottom surface area defining the recesses, spaced therefrom.

The above-described dimensional relationships, structural design, and the aforesaid inherent physical properties exhibited by the members, or those portions incorporated in the immediate internally stressed transverse column areas of the joints therebetween, are significantly important to the success and advantages attributable to the invention, and these are substantially enhanced by the fact that the permanently and plastically deformed or swedged lower terminal configurated connecting flange portions of the joint structure actually provide the aforementioned internally stressed transconfigurated substantially straight (horizontal or flat), and/or undulating columnar, transverse column sections or areas extending across and in opposite edge contact with the opposite diverging side walls defining the undercut recesses receiving the same, with the aforesaid permanently transformed column sections, or areas, reacting outwardly against the lateral side walls of the retaining recesses to thereby insure internally stressed relatively high frictional engagement between the permanently deformed and transformed lower terminal column-forming marginal connecting flange areas and oppositely disposed surfaces of the undercut recesses in direct contact and abutment therewith.

Having fully described and illustrated several panel and joint structures, both generally and specifically, what is claimed is:

1. A swedged joint structure between a member having an offset connecting flange exhibiting resilient plastic permanently deformable properties and a rigid substantially non-deformable supporting member therefor, said connecting flange being initially transversely configurated to provide a substantially centrally raised portion terminating in laterally oppositely disposed subtending marginal edges contiguous therewith, said rigid supporting member having a channel-shaped recess in a face thereof defined by opposite lateral side walls diverging towards an inner bottom web surface contiguous with said diverging side walls and uninterferingly receiving said initially configurated connecting flange through the facial entrance thereto, said bottom web surface of the recess being depressed below the plane of the maximum transverse width dimension between the diverging side walls of the recess, said transverse contiguous width of the initially configurated offset connecting flange between the subtending marginal edges thereof being 3 to 10 percent in excess of the maximum transverse width dimension between the diverging side walls of the recess, said initially configurated offset connecting flange on permanent deformation and transformation within said recess providing tight interlocking lateral frictional engagement of the opposite subtending marginal edges thereof against the diverging side walls of the recess in internally stressed transverse columnar loaded condition of the permanently deformed and tranformed connecting flange within said recess, said so permanently deformed and transformed columnar loaded condition of the connecting flange being located within a transverse rectangular band substantially bisected by the maximum width dimension of the recess in parallel disposition to the transverse long sides of the rectangular band, and said so deformed and transformed offset connecting flange having an underside area facing and spaced from the depressed inner bottom web surface of the recess.

2. A mcehanically swedged joint construction between a member having a connecting flange exhibiting resilient plastic permanently deformable properties and a rigid substantially non-deformable supporting member therefor, said connecting flange being initially transversely configurated to provide a substantially centrally raised portion terminating in laterally oppositely disposed subtending marginal edges contiguous therewith, said rigid supportng member having a channel-shaped recess in a face thereof defined by opposite lateral side walls diverging towards an inner bottom web surface contiguous with said diverging side walls and uninterferingly receiving said initially configurated connectng flange through the facial entrance thereto, said bottom web surface of the recess being substantially centrally depressed below the plane of the maximum transverse width dimension between the diverging side walls of the recess, said transverse contiguous width of the initially configurated connecting flange being 3 to 10 percent in excess of the maximum transverse width dimension between the diverging side walls of the recess, said initially substantially centrally raised portion of the connecting flange being permanently transversely deformed and transformed over its axial length and providing tight interlocking lateral frictional wedging engagement of the oppositely disposed subtending marginal edges thereof against the diverging side walls of the recess in internally stressed transverse columnar loaded condition within said recess, said so permanently transversely deformed and transformed connecting flange being characterized by lying within a transverse rectangular band area substantially bisected by the plane of the maximum width dimension of the recess in parallel disposition to the long sides of the transverse rectangular band area, and said so deformed and transformed connecting flange having an underside surface facing and spaced from the depressed inner bottom web surface of the recess.

3. A swedged joint construction between a member having a connecting flange exhibiting resilient plastic permanently deformable properties and a rigid substantially non-deformable supporting member therefor, said connecting flange being initially transversely outwardly angularly configurated to provide a substantially centrally raised portion terminating in laterally oppositely disposed subtending marginal edges contiguous therewith, said rigid supporting member having a channel-shaped recess in a face thereof defined by opposite lateral side walls diverging towards an inner bottom web surface contiguous with said diverging side walls and uninterferingly receiving said intitially configurated connecting flange through the facal entrance thereto, said bottom web surface of the recess being substantially centrally depressed below the transverse plane of the maximum transverse width dimension between the diverging side walls of the recess, said transverse contiguous width of the initially angularly configurated connecting flange between the opposite subtending marginal edges thereof being 3 to 10 percent in excess of the maximum transverse width dimension between the diverging side walls of the recess, said initially substantially centrally raised portion of the connecting flange being permanently transversely deformed and transformed at spaced localized intervals along its axial length and providing tight interlocking lateral frictional wedging engagement of the oppositely disposed subtending marginal edges of the connecting flange adjacent the localized transformed areas thereof against the diverging side walls of the recess in internally stressed transverse columnar loaded condition within said recess, said so pormanently deformed and transformed connecting flange being characterized by a transverse center line column loading axis of each of its localized transformed areas, said center line column loading axes falling within a transverse rectangular band across the recess having a center line of bisection of the transverse band lying within a transverse plane containing the maximum width dimension across the recess, and said transverse rectangular band being confined within the maximum depth of the recess.

4. A mechanically swedged joint construction between a panel member having a connecting flange exhibiting resilient plastic permanently deformable properties and a rigid substantially non-deformable supporting member therefor, said connecting flange being initially transversely configurated to provide a substantially centrally raised portion terminating in laterally oppositely disposed subtending marginal edges contiguous therewith, said rigid supportng member having a channel-shaped recess in a face thereof defined by opposite lateral side walls diverging towards an inner bottom web surface continguous with said diverging side walls and uninterferingly receiving said initally configurated connectng flange through the facial entrance thereto, said bottom web surface of the recess being substantially centrally depressed below the transverse plane of the maximum transverse width between the diverging side walls of the recess, said transverse contiguous width of the initially configurated connecting flange between its opposite subtending marginal edges being 3 to 10 percent in excess of the maximum transverse width dimension between the diverging side walls of said recess, said initially substantially centrally raised portion of the connecting flange being permanently transversely deformed and transformed within said recess and providing tight interlocking lateral frictional wedging engagement of the oppositely disposed subtending marginal edges thereof against the diverging side walls of the recess in internally stressed transverse columnar loaded condition therewithin, said so permanently deformed and transformed connecting flange being characterized by a transverse center line column loading axis falling within a transverse rectangular band area disposed within the maximum depth dimension of the depressed recess bisected across the recess by the transverse plane of the maximum width dimension of the transverse rectangular band area, and said so permanently deformed and transformed connecting flange having a substantially centrally permanently deflected area out of surface contact with the centrally depressed inner bottom web surface of the recess.

5. A mechanically swedged joint construction between a member having a connecting flange of uniform gauge thickness exhibiting resilient plastic permanently deformable properties and a rigid substantially non-deformable supporting member therefor, said connecting flange being initially transversely configurated to provide a substantially centrally raised portion terminating in laterally oppositely disposed subtending marginal edges contiguous therewith, said rigid supporting member having a channel-shaped recess in a face thereof defined by opposite lateral side walls diverging towards an inner bottom web surface contiguous with said diverging side walls and uninterferingly receiving said initially configurated connecting flange through the facial entrance thereto, said bottom web surface of the recess being substantially centrally transversely depressed below the plane of maximum transverse width between the diverging side walls of the recess, said initially substantially centrally raised connecting flange being permanently inwardly transversely crimped and transformed at axially spaced intervals along the length thereof in planes angularly disposed between 40° and 50° to the longitudinal axis of the recess in the form of substantially flat-bottomed angularly disposed valleys, said valleys and immediately contiguous axially disposed areas on either side thereof of the so-transformed and crimped connecting flange forming substantially equal rectangular areas defined by the valleys as diagonals thereof and each of the areas constituting a transversely internally stressed laterally wedging column within the recess, and each wedging column having a transverse center line column loading axis within a transverse rectangular band having a center line in the plane of maximum transverse dimensional width of the recess.

6. A swedged joint construction between a member having a connecting flange exhibiting resilient plastic permanently deformable properties and a rigid substantially non-deformable supporting member therefor, said connecting flange being initially transversely configurated to provide a substantially centrally raised portion terminating in laterally oppositely disposed subtending marginal edges contiguous therewith, said rigid supporting member having a channel-shaped recess in a face thereof defined by opposite lateral side walls diverging towards an inner bottom web surface contiguous with said diverging side walls and uninterferingly receiving said initially configurated connecting flange through the facial entrance thereto, said bottom web surface of the recess being substantially centrally depressed below the plane of the maximum transverse width between the diverging side walls of the recess, said transverse contiguous width of the initially configurated connecting flange being 3 to 10 percent in excess of the maximum width dimension between the diverging side walls of said recess, said initially substantially centrally raised portion of the connecting flange being axially continuously permanently transversely deformed and transformed and providing tight interlocking lateral frictional wedging engagement of the oppositely disposed subtending marginal edges thereof against the diverging side walls of the recess in internally stressed transverse columnar loaded condition therewithin, said so deformed and transformed connecting flange being characterized by an axially continuous undulating transverse cross-sectional configuration exhibiting transverse center line column loading, and said center line column loading having an effective transverse axis falling within a transverse rectangular band area bisected by a transverse plane containing the maximum width dimension across the recess.

7. A mechanically swedged joint construction between a panel member having a sheet metal connecting flange of uniform gauge thickness exhibiting resilient plastic permanently deformable properties and a rigid substantially non-deformable supporting member therefor, said connecting flange being initially transversely configured to provide a substantially centrally raised portion contiguous with and terminating in laterally oppositely disposed subtending marginal edges, said rigid supporting member having a channel-shaped recess in a face thereof defined by opposite lateral side walls diverging towards an inner bottom web surface contiguous with said diverging side walls and uninterferingly receiving said initially configurated connecting flange through the facial entrance thereto, said bottom web surface of the recess being substantially centrally depressed below a transverse plane containing the maximum transverse width dimension between the diverging side walls of the recess, said transverse contiguous width of the initially configurated connecting flange between the opposite subtending marginal flanges thereof being 3 to 10 percent in excess of the maximum width dimension between the diverging side walls of said recess, and said initially configurated connecting flange being permanently transversely deformed and transformed within said recess and providing interlocking lateral frictional wedging engagement of its oppositely disposed subtending marginal edges against the diverging side walls of the recess to provide internally stressed transverse columnar loaded condition thereof within the recess, and said transverse columnar loaded condition of the so permanently deformed and transformed connecting flange having transverse center line column loading the effective transversely loaded column axis of which falls within a transverse rectangular area having a bisecting transverse center line substantially coincident with the transverse plane of the maximum width dimension of the recess between the diverging side walls thereof.

8. A mechanically swedged joint construction between a uniform gauge thickness panel member having an integral connecting flange exhibiting resilient plastic permanently deformable properties and a rigid substantially non-deformable supporting member therefor, said connecting flange being initially transversely configurated to provide a substantially centrally raised portion terminating in laterally oppositely disposed subtending marginal edges contiguous therewith, said rigid supporting member having a channel-shaped recess in a face thereof defined by opposite lateral side walls diverging towards an inner bottom substantially centrally depressed web surface contiguous with said diverging side walls and uninterferingly receiving said initially configurated connecting flange through the facial entrance thereto, said bottom web surface of the recess being substantially centrally depressed below the transverse flat plane of the maximum transverse width between the diverging side walls of the recess, said initially configurated connecting flange having an over-all contiguous transverse width 3 to 10 percent in excess to the maximum normal transverse width across the diverging walls of the recess, said initially configurated connecting flange being permanently deformed and transformed at spaced locations along the longitudinal axis of the recess to form lateral columnar wedging frictional joints between the subtending marginal edges thereof and contacting coextensive side wall areas of the recess, said joints constituting internally stressed loaded columns the effective stabilizing loading center lines of which fall within a transverse band having a transverse center line substantially coincident with the maxium transverse width across the recess, and said internally stressed and loaded column joints each having a substantially centrally located exterior surface facing and out of contact with the inner bottom substantially centrally depressed web surface of the recess.

9. The method of making mechanically swedged stabilized jointure between a plastically deformable member and a less deformable supporting member, the steps comprising:
(a) selecting the plastically deformable member in transverse cross-sectional configuration providing an upwardly extending central portion and subtending marginal edges contiguous therewith,
(b) selecting the supporting member to provide a laterally undercut recess in a face thereof and having a substantially centrally depressed inner bottom surface area,
(c) disposing the configurated deformable member within the recess with its upwardly extending central portion directed away from the depressed inner bottom surface area of the recess,
(d) permanently deforming and transforming the upwardly extending central portion of the plastically deformable member towards the inner depressed bottom surface area of the recess to a position within the same below a transverse plane coincident with the maximum width dimension across the laterally undercut recess to laterally separate the contiguous opposite lateral marginal subtending edges thereof into wedged frictional engagement with the lateral undercut recess, and
(e) establishing transverse columnar loading of the so permanently deformed and transformed plastically deformable member within the recess to provide transverse center line column loading thereof in a transverse rectangular band area having a bisecting transverse center line substantially coincident with the maximum transverse width dimension of said recess.

References Cited by the Examiner
UNITED STATES PATENTS

| | | |
|---|---|---|
| 380,199 | 3/1888 | Gemunden et al. |
| 2,776,735 | 1/1957 | Bancroft _____ 189—36 |
| 3,205,001 | 9/1965 | Abolins _____ 52—222 |

References Cited by the Applicant
UNITED STATES PATENTS

| | | |
|---|---|---|
| 1,984,232 | 12/1934 | Peremi et al. |
| 2,164,414 | 7/1939 | Long. |
| 3,000,093 | 9/1961 | Wredenfors. |
| 3,028,192 | 4/1962 | Jewell. |
| 3,055,461 | 9/1962 | De Ridder. |

FOREIGN PATENTS 524,344   12/1953   Belgium.

HARRISON R. MOSELEY, *Primary Examiner.*
P. M. CAUN, *Assistant Examiner.*